United States Patent
Stabile et al.

(10) Patent No.: US 7,104,124 B2
(45) Date of Patent: Sep. 12, 2006

(54) METHOD FOR INDICATING DURATION OF GAS SUPPLY REMAINING AND PROVIDING RESULT TO USER THEREOF

(76) Inventors: James R. Stabile, 926 Saddleback Rd., Newton, NJ (US) 07860; William I. Mack, 27 Rambling Brook Rd., Upper Saddle River, NJ (US) 07458

( * ) Notice: Subject to any disclaimer, the term of this patent is extended or adjusted under 35 U.S.C. 154(b) by 149 days.

(21) Appl. No.: 10/139,419

(22) Filed: May 6, 2002

(65) Prior Publication Data

US 2002/0170347 A1 Nov. 21, 2002

Related U.S. Application Data

(60) Provisional application No. 60/288,919, filed on May 4, 2001.

(51) Int. Cl.
*G01F 17/00* (2006.01)

(52) U.S. Cl. ............................................. 73/149
(58) Field of Classification Search ............... 73/149, 73/23.3; 126/41 R
See application file for complete search history.

(56) References Cited

U.S. PATENT DOCUMENTS

| | | | | |
|---|---|---|---|---|
| 3,875,801 A | * | 4/1975 | Bishaf | 73/714 |
| 4,782,451 A | * | 11/1988 | Mazzarella et al. | 700/281 |
| 5,016,483 A | * | 5/1991 | Budinger | 73/865.1 |
| 5,033,449 A | * | 7/1991 | Hanagan | 126/39 BA |
| 5,881,779 A | * | 3/1999 | Kountz et al. | 141/83 |
| 5,899,204 A | * | 5/1999 | Cochran | 128/205.23 |
| 5,979,233 A | * | 11/1999 | Johnson | 73/149 |
| 6,038,919 A | * | 3/2000 | Schmitt et al. | 73/149 |
| 6,258,039 B1 | * | 7/2001 | Okamoto et al. | 600/529 |
| 6,543,444 B1 | * | 4/2003 | Lewis | 128/200.24 |
| 2003/0047178 A1 | * | 3/2003 | Barth et al. | 126/41 R |

FOREIGN PATENT DOCUMENTS

GB WO 01/69340 A2 * 3/2001

* cited by examiner

*Primary Examiner*—Hezron Williams
*Assistant Examiner*—Tamiko Bellamy
(74) *Attorney, Agent, or Firm*—Bradley N. Ruben

(57) ABSTRACT

A system for identifying the time remaining for a bottled gas supply to lapse. Such bottled gas supplies include those used for gas grilles, scuba, nitrogen for electron microscopes, and any other environment in which a bottled gas is used. The system reads the pressure and optionally the temperature of the gas container, the readings of which are read by a microprocessor, optionally first pre-processed in a conversion module, and converted into a display for the user identifying the time during which the gas contents remaining will last. In various systems, it may be desirable to program the microprocessor, such as with input from a keyboard and/or cd-rom, with parameters regards specifics of the gas or the container, or to simply processing by assuming a certain temperate correlation and thereby eliminate the need for a temperature transducer.

11 Claims, 1 Drawing Sheet

METHOD FOR INDICATING DURATION OF GAS SUPPLY REMAINING AND PROVIDING RESULT TO USER THEREOF

This application is based on prior filed applications Ser. No. 09/630,212, filed 1 Aug. 2000, now U.S. Pat. No. 6,244,540, Ser. No. 09/080,187, filed 18 May 1998, now abandoned, and provisional application No. 60/288,919, filed 4 May 2001, the disclosures and figures of which are incorporated herein by reference in their entirety.

BACKGROUND OF THE INVENTION

1. Field of the Invention

This invention relates to a system and method for displaying to a user of a canned gas (whether used as fuel, for breathing, or the like) the time remaining for use of the gas in the container.

2. The State of the Art

The afore-mentioned applications are directed to oxygen requirements for jet aircraft, and more specifically to determining, after an emergency depressurization, the proper flight level (FL; altitude to fly) to balance the the fuel reserve and the oxygen reserve under such conditions. After an emergency depressurization, if the plane can make an alternate airport at a FL100 (10,000 foot elevation), there is no need for emergency oxygen; only at higher flight levels is oxygen required. However, the higher a jet flies, the less fuel is required. So there is a balance between the amount of emergency oxygen and the amount of fuel in order for the plane to reach an alternate airport during an emergency.

One method for providing an indication to the pilot(s) of the oxygen remaining is to sense the pressure, and preferrably also the temperature, of the pressurized gas source. These measurements are then used, in combination with a microprocessor, to calculate the volume of gas (e.g., liters) in the gas container. As gas it used, the pressure and temperature of the source change; sampling of this information over time provides a lapse rate. Alternatively, an actual flow meter can be used to measure the flow of gas, and sampled over time via the microprocessor, a lapse rate can be determined. The combination of the lapse rate and the calculated amount of gas remaining provides an indication of the duration for which the remaining gas will last.

It is this duration which is the subject matter of the instant specification. Bottled compressed gas is used for various endeavors and in various industries: acetylene for welding; nitrogen for electron microscopes; oxygen (or modified oxygen, containing nitrogen and/or helium) for scuba and for firefighters; and hydrocarbons for domestic heating and hot water, for powering vehicles, and for cooking; among others.

SUMMARY AND OBJECTS OF THE INVENTION

Accordingly, it an object of this invention to provide an indicating system as described in the aforementioned applications, but used for these non-aeronotical indications. In a preferred embodiment, the device can be preset with an indication for how much time the remaining gas should last based on an ideal flow rate, and that value can be varied depending on the actual flow rate.

In one embodiment, this invention provides a device for determining the time remaining for use of a compressed gas stored in a canister, comprising an inlet port for connecting to the gas canister, a fluid connection between the inlet port and an outlet port, the outlet port for connecting to a device using the gas or to a line leading to such a device, the fluid connection having therein means for sensing the pressure and/or flow rate of the gas therethrough, and optionally the temperature of the gas, the sensor(s) connected to a microprocessor for calculating at least one lapse rate and the time or amount of gas remaining, and a means for displaying the time or amount of gas remaining.

DESCRIPTION OF SPECIFIC EMBODIMENTS

Figure 1:
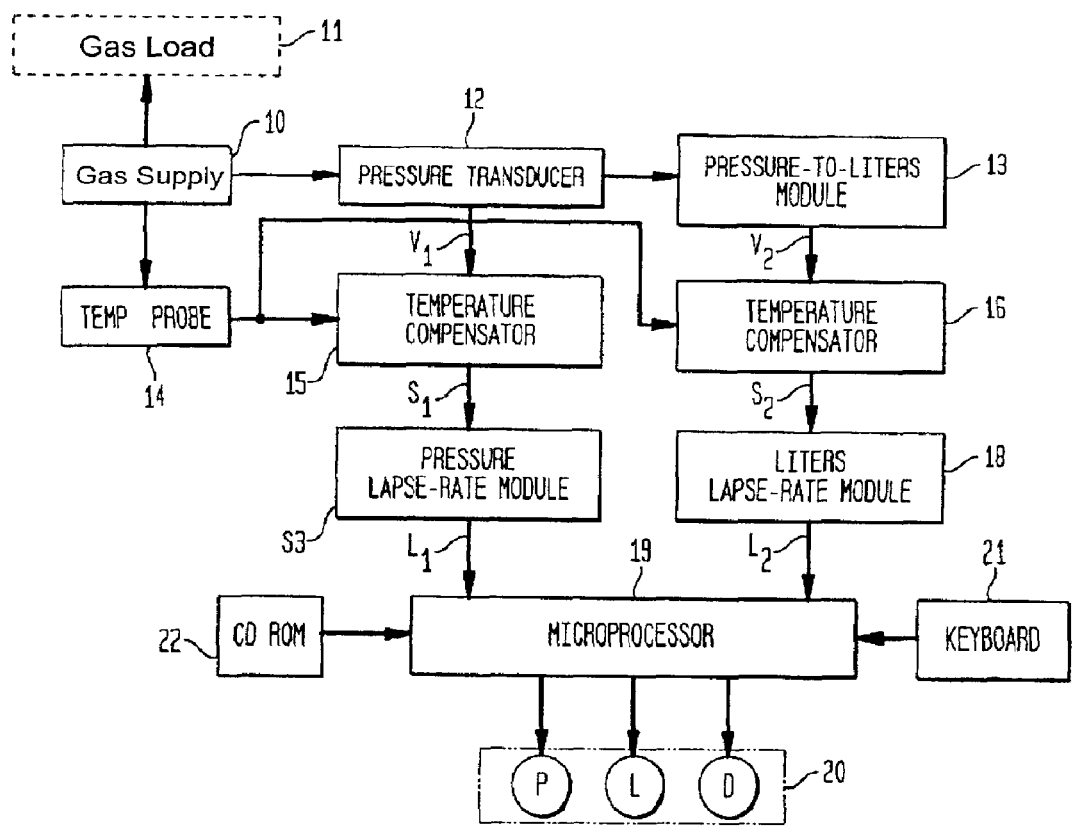
FIG. 1 depicts an idealized version of the device for determining and displaying the time remaining for a gas supply.

The reader is referred to the above-referenced U.S. Pat. No. 6,244,540, the disclosure of which is incorporated herein by reference, for a detailed description of the operation of the device in connection with a jet aircraft.

In connection with non-aircraft-related uses for contained gas, for example, suppose that a medium size bottle of liquified propane gas (LPG) is used for an outdoor grill (barbeque), and based on the burner(s) (which have a certain BTU rating), the amount of LPG gas in the container (having a certain number of available BTUs) will provide a given number of hours of cooking time based on a certain flow rate (which might be assumed to be 80% of the maximum flow rate). Thus, the system will show an original amount of time (e.g., 10 hours) when it is first engaged on a filled LPG canister, and as the gas is used for cooking, a lapse rate is generated; the system can estimate the time remaining by the deviation in the actual gas flow from the ideal, and/or can compensate by measuring (as with the oxygen system for the jet) the change in pressure (and optionally temperature) of the gas in the canister. In this way, a person can determine how much cooking time is remaining, and thus whether to have the canister refilled before the weekend barbeque.

In the just-described LPG grill scenario, the original amount of time can be based on the grill device to which the canister is attached, or the device can be provided with a keypad and display for entering specific information pertinent to the monitoring or calculation. Information can be via remote IR, RF, or direct line (twisted pair, coaxial). For example, a user may have a choice as to what fuel or fuel mixture with which to fill a container, or may have multiple containers which can be used. Typically, one uses propane, butane, or a propane/butane mixture for cooking. The conventional container has a snap connection or screw connection to the valve/regulator. The present device is placed in the line between the container and the line leading to the grill, and depending on the contents of the gas in the container, the device can be programmed to calculate the time remaining as a function of the gas. A keyboard (and/or cd-rom player) can be used with an interface to the device to program the device for use with a given container or gas, assuming that the device is used on multiple containers and/or with multiple gases.

In one embodiment, the invention comprises an inlet port for connecting to a gas canister having a fluid connection with an outlet port for connecting to a device using the gas (or a line leading to such a device), the fluid connection having therein means for sensing the pressure and/or flow rate of the gas, and optionally the temperature of the gas, the sensor(s) connected to a microprocessor, as described in the aforementioned applications incorporated herein by reference, for calculating at least one lapse rate (e.g., pressure and/or volume) and the time or amount of gas remaining, and a means for displaying the time or amount of gas remaining. Preferably, the device also has a means for a user to enter information directly into the microprocessor, such as the initial amount of gas and/or the type of gas; alternatively, the device can be pre-designed to function with a specific composition of gas and/or a specific initial volume of gas. There are various means for measuring pressure, flow rate (mass and volumetric), and temperature that are well-known in the instrumentation arts. The display can be a gauge (mechanical or electrical) or a screen (LCD or LED); or the display can comprise a signal sent to a remote display means, such as a thermostat or a computer (e.g., for LPG stored in large containers used for domestic heating and hot water). The means for entering information can be a touch screen, push buttons, or a combination thereof, and may be assisted by information from the screen (e.g., providing options for the user, such as prompting to enter "1" for a propane gas or "2" for a butane gas).

In another embodiment, the device is positioned on the gas canister (or tank) prior to the regulator. As in the above-mentioned applications, the device senses the pressure, and preferably the temperature, in the canister, monitoring the lapse rate as a function of the change in pressure of the tank, and the volumetric lapse rate is measured as a function of the volume flow through the regulator.

Of course it should be understood that the temperature and pressure of the gas should be measured prior to any valving (such as a regulator) to avoid inaccurate readings due to JT or Venturi effects, and the like, due to the valving and similar fluid connections. Further, depending on the operating environment, the temperature probe can be eliminated and the microprocessor and/or pressure-to-liters module designed to assume a certain mean temperature.

In FIG. 1 there is shown a basic system in accordance with the invention adapted to monitor the gas in a pressurized supply 10. Gas drawn from this supply is fed to a gas load 11, such as a gas grill, a scuba diver, or the like. The container, when full, contains X liters of oxygen under a given pressure. Mounted on the outlet port of the container is a pressure transducer 12 which translates the gas pressure to a voltage V1 whose magnitude is proportional thereto. Suitable pressure transducers are well-known in the art and typically have an analog output in the 1 to 6 volt DC range. Coupled to transducer 12 is an integrated-circuit pressure-to-liters module 13 that converts the voltage yielded by the transducer that depends on the pressure of the supply to a voltage V proportional to the number of liters of gas in the supply. This relationship between pressure and the number of liters of gas can be determined for any given gas, and can be linear within a given temperature range. In order to provide temperature correction, if needed, the temperature of supply 10 is sensed by a probe 14 which in practice may be a thermocouple whose output voltage rises and falls with variations of temperature. The output of probe 10 is applied both to a temperature compensator 15 coupled to the output of pressure transducer 12 and to a temperature compensator 16 coupled to the output of pressure-to-liters module 13. Hence yielded by compensator 15 is a temperature-corrected pressure signal $S_1$, while yielded by compensator 16 is a temperature-corrected liters signal $S_2$.

For a known quantity of gas in the supply, the time remaining until the supply is depleted (hereinafter referred to as "duration") is computed by dividing the initial quantity of gas expressed in liters by its rate of depletion in a unit of time consumption rate in (liters per minute). This computation affords a direct reading of time remaining before the gas supply is exhausted. Signal $S_1$ from temperature compensator 15 is applied to a pressure lapse rate module 17. Module 17 periodically samples pressure signal to yield a pressure lapse-rate signal $L_1$. By lapse rate is meant the rate, per unit of time, (one minute) at which the pressure of gas in the supply decreases as oxygen is drained from the supply. Signal $S_2$ from temperature compensator 16 is applied to a lapse rate module 18 which determines the rate, per unit time, at which liters of gas in the supply are being drained therefrom. Module 18 periodically samples this rate to yield a liters lapse rate signal $L_2$. The pressure lapse rate signal $L_1$ and the concurrently produced liters lapse rate signal $L_2$ are applied to the input of a microprocessor 19 in which the signals are digitalized and then processed to provide the following readouts which are displayed where desired.

As mentioned, this device is useful for any compressed, bottled gas, from a small cooking stove, where the microprocessor and all of the gas composition and original amount data are provided on a single chip, and so one device can be sold with each gas canister sold and is essentially disposable, to natural gas-powered (or hydrogen powered) transportation, where the car may be driven over a 100° F. temperature range and knowing how much fuel remains can be very important.

What is claimed is:

1. A device for determining the time or quantity remaining for use of a compressed gas stored in a canister as the canister is being emptied, irrespective of the weight of the canister, comprising:
   an inlet port for connecting to the gas canister;
   a fluid connection between the inlet port and an outlet port, the outlet port for connecting to a gas consuming device using the gas or to a line leading to a gas consuming device,
   a microprocessor including means for storing the initial amount of gas in the canister and optionally the type of gas in the canister;
   the fluid connection having therein means for sensing the pressure and/or flow rate of the gas to the gas consuming device, and optionally the temperature of the gas, the sensor(s) connected to said microprocessor and said microprocessor calculating the pressure lapse rate and the volumetric lapse rate, and therefrom the time until the canister is emptied of gas, said device including means for storing said time; and
   a means for displaying the time until the canister is emptied.

2. The device of claim 1, further comprising means for a user to enter information directly into the microprocessor.

3. The device of claim 2, wherein the data entry means is a keyboard.

4. The device of claim 2, wherein the data entry means is via remote IR, RF, or direct line connection to a computer.

5. The device of claim 1, wherein the display is remote from the device.

6. The device of claim 1, wherein the device is designed specifically for a single gas.

7. The device of claim 6, wherein the gas is stored where the expected temperature range is from about −30° F. to about 120° F. and the device has sensor adapted for said temperature range.

8. The device of claim 6 or 7, wherein the gas is a fuel gas, and wherein the device calculates the lapse rate based on the heat content of the gas.

9. The device of claim 8, wherein the device senses the ambient temperature and adjusts the calculated lapse rate based on the ambient temperature.

10. A method for indicating the amount of compressed gas remaining in a container that is being emptied of the gas, comprising:

A. providing a container of compressed gas and connecting said container to a gas consuming device which utilizes the gas;

B. measuring the pressure of the gas in the container;

C. converting the measured pressure into a signal indicative of the volume of gas in the container;

D. measuring the apse rate at which the pressure in the container decreases;

E. converting the lapse rate of pressure decrease into a lapse rate in volume;

F. calculating, based on both the pressure lapse rate and the volume lapse rate, and input related to the initial amount of gas in the container, and optionally the type of gas in the container, the duration during which the gas can be supplied from the container;

G. displaying the duration during which gas can be supplied from the container to the gas consuming device; and H. storing said duration calculation.

11. The method of claim 10, further comprising:

measuring the temperature of the gas in the container;

correcting the pressure lapse rate and/or the volumetric lapse based on the temperature; and calculating the duration based on the temperature-corrected pressure lapse rate and/or the temperature-corrected volumetric lapse rate.

* * * * *